United States Patent [19]

Dion et al.

[11] 3,762,007

[45] Oct. 2, 1973

[54] ROTARY HOLLOW MILLING CUTTER

[75] Inventors: Paul A. Dion; Paul O. Hagarman, both of North Attleboro, Mass.

[73] Assignee: Polymetallurgical Corp., Attleboro, Mass.

[22] Filed: Jan. 11, 1971

[21] Appl. No.: 105,237

Related U.S. Application Data

[63] Continuation-in-part of Ser. No. 103,518, Jan. 4, 1971, Pat. No. 3,714,701, Continuation-in-part of Ser. No. 104,701, Jan. 7, 1971, Pat. No. 3,702,497.

[52] U.S. Cl. .................. 29/103 R, 82/20 R, 82/1 B
[51] Int. Cl. .......................... B26d 1/12, B23b 5/00
[58] Field of Search .................. 29/103, 105; 82/20

[56] References Cited
UNITED STATES PATENTS

| 1,623,927 | 4/1927 | Lenhardt | 29/103 |
| 2,126,476 | 8/1938 | Koonz | 29/103 |
| 661,554 | 11/1900 | Roberts | 29/105 |
| 433,615 | 8/1890 | Brown | 29/105 X |

Primary Examiner—Harrison L. Hinson
Attorney—Chittick, Pfund, Birch, Samuels & Gauthier

[57] ABSTRACT

A rotary hollow milling cutter for removing the peripheral surface of a moving length of round metal rod. The milling cutter is used to cut away the contaminated surface of a core rod to prepare it for the subsequent solid-phase bonding thereto of a cladding sheath to produce a clad rod. All the contiguous central edges of the cutter teeth are cutting edges and no portion of the rod is exposed to the atmosphere after being cut by the teeth.

7 Claims, 8 Drawing Figures

INVENTORS
PAUL A. DION
PAUL O. HAGARMAN

BY Chittick, Pfund
Birch, Samuels + Gauthier
ATTORNEYS

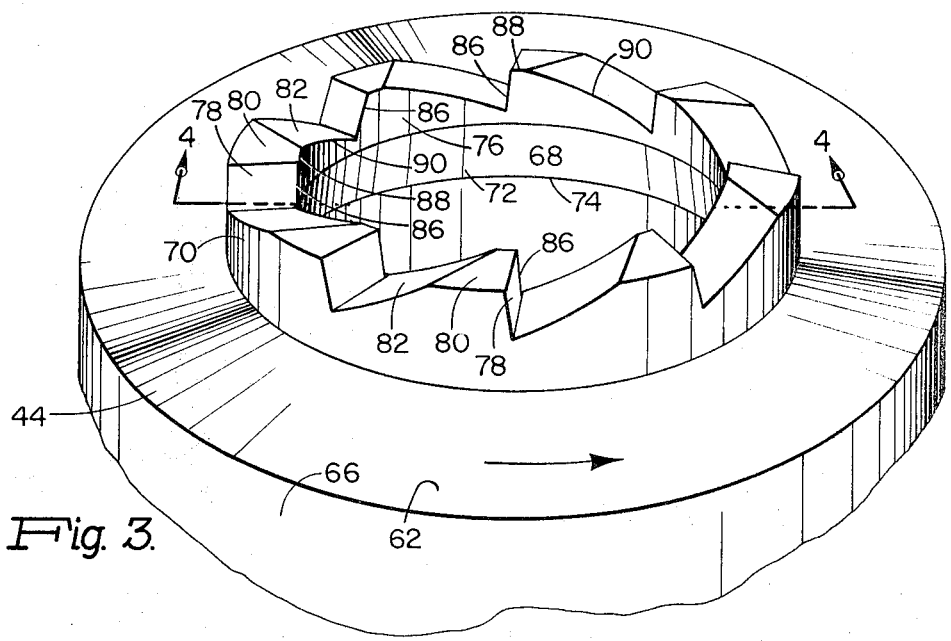
Fig. 3.
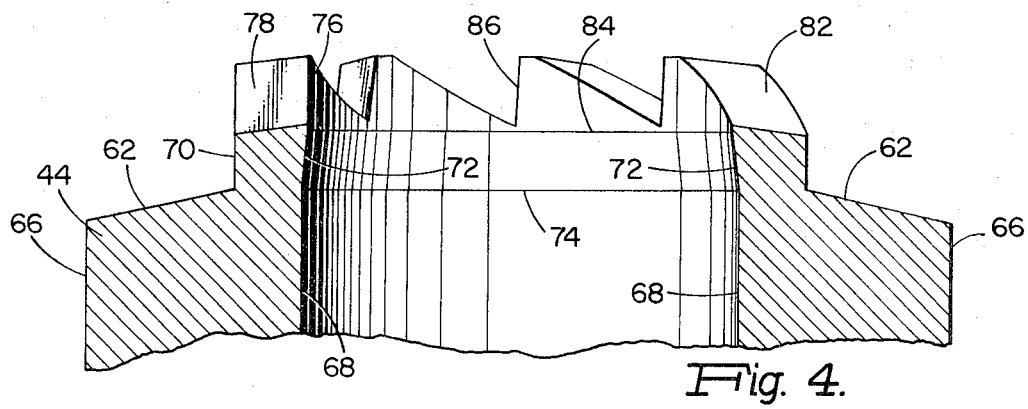
Fig. 4.
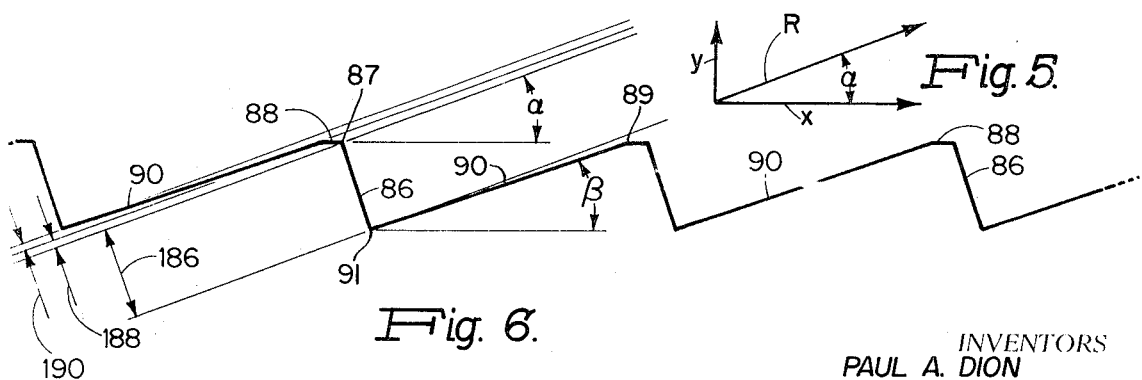
Fig. 5.
Fig. 6.
INVENTORS
PAUL A. DION
PAUL O. HAGARMAN
BY Chittick, Pfund
Birch, Samuels & Gauthier
ATTORNEYS

INVENTORS
PAUL A. DION
PAUL O. HAGARMAN

3,762,007

ROTARY HOLLOW MILLING CUTTER

CROSS-REFERENCE

This application is a continuation in part of the following co-pending prior applications by the same inventors:

a. Ser. No. 103,518 filed Jan. 4, 1971, now U.S. Pat. No. 3,714,701 issued Feb. 6, 1973.

b. Ser. No. 104,701 filed Jan. 7, 1971, now U.S. Pat. No. 3,702,497 issued Nov. 14, 1972.

BRIEF SUMMARY OF THE INVENTION

This invention is a rotary hollow milling cutter adapted to cut away the peripheral surface of a moving length of round metal core rod, preferably aluminum. The cutter is designed so that as the rod surface is cut away, the underlying uncontaminated surface of the rod is passed immediately into the interior of the cutting head where it is maintained uncontaminated to ensure a good subsequent bond with a peripheral sheath of cladding metal.

The primary feature of this invention is that the cutter teeth have contiguous central edges defining the inner circumference of the hollow milling cutter head and all of the central edges are cutting edges. This ensures that after the core rod surface is cut away by the cutter teeth, no portion of the underlying rod surface is re-exposed to the oily atmosphere surrounding the cutter teeth. Instead, the underlying rod surface is immediately directed into and confined within the cutter head where means are provided to prevent recontamination of the underlying rod surface.

BRIEF DESCRIPTION OF THE DRAWINGS

FIG. 3 is a perspective view of the rotary hollow milling cutter of this invention;

FIG. 4 is a view in section taken along line 4—4 of FIG. 3.

FIG. 5 is a vector diagram useful in explaining the cutting action of the cutter teeth;

FIG. 6 is a cutter teeth profile partial development taken on the cutter head central aperture inner circumference;

DETAILED DESCRIPTION

Figure 1:
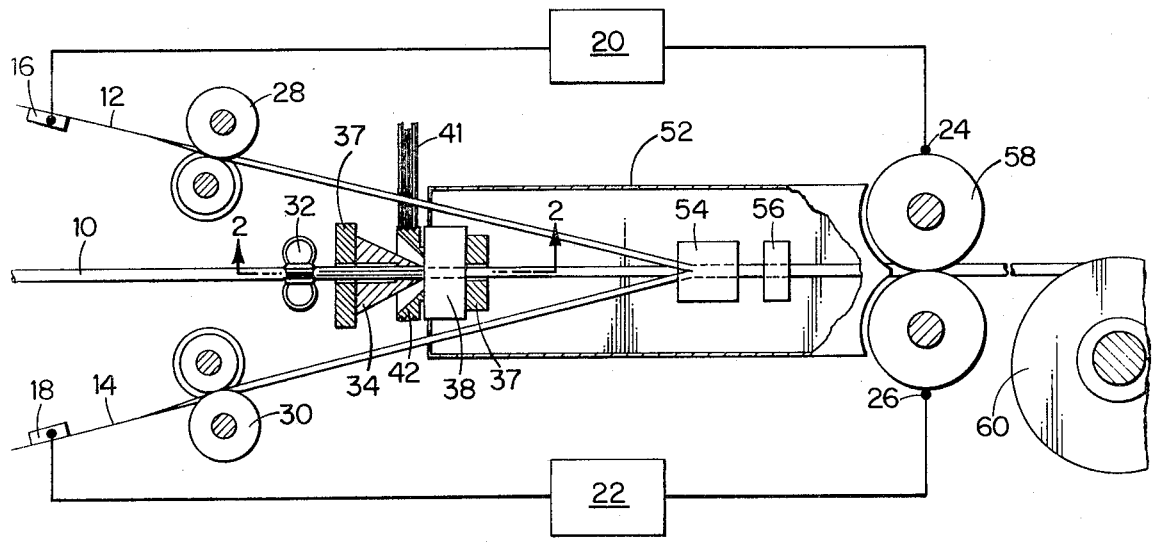
FIG. 1 is a schematic diagram of a copper clad aluminum line in which the rotary hollow milling cutter of this invention is advantageously employed.

FIG. 1 shows the schematic flow diagram of a copper clad aluminum processing line which is disclosed in FIG. 1 of our co-pending application Ser. No. 103,518, now U.S. Pat. No. 3,714,701. This processing line is one of many such lines in which the rotary hollow milling cutter of this invention can be advantageously employed. The purpose of the cutter is to prepare a core rod for subsequent bonding of removing its peripheral surface.

Briefly, aluminum core rod 10 issues from an unshown pay-off coil at approximately 100 ft/min. The core rod is pre-sized at, for example, 0.610 inches diameter.

Simultaneously, cooper cladding strips 12 and 14 issue from unshown pay-off coils at approximately 100 ft/min. The cladding strips are electrically heated by passing a current through them. The heating circuit includes, in addition to the cladding strips, electrical contacts 16 and 18, power supplies 20 and 22, and bonding roll contacts 24 and 26. The oily residues on the copper strips, as well as other contaminants are vaporized by the heating circuit.

Copper cladding strips 12 and 14 enter preforming roll stands 28 and 30 which roll the strips into semi-circular shapes with their concave surfaces opening toward core rod 10. After the strips 12 and 14 leave the preforming roll stands 28 and 30, the temperature of the strips continues to rise thereby vaporizing all remaining contaminants on the strips.

As can be seen in FIG. 1, the aluminum core rod 10 has meanwhile been moving down the line at room temperature. The first operation undergone by core rod 10 is entirely optional. A gang assembly of four scoring rolls 32 is shown in FIG. 1 and in cross-section in FIG. 2. This assembly 32 rolls longitudinal score lines into the surface of the core rod 10 for the purpose of ensuring a uniform short chip length at the subsequent hollow milling operation. Short chips are easy to clear and don't become tangled in the machinery. The score lines can be longitudinal, spiral or any other conventional configuration. The four scoring rolls impart eight longitudinal score lines in the surface of the core rod.

After receiving the optional scoring treatment, the aluminum core rod 10 has its oily surface removed by a hollow milling cutter which is shown in more detail in FIG. 3. First, core rod 10 passes through the cylindrical recesses formed in both machine frame 37 and bushing support 34 which is fixed to the machine frame. Then, the core rod is centered and supported by fixed guide bushing 36 which is mounted on bushing support 34. A hollow mill support 38 is fixed to machine frame 37 and is located downstream of fixed bushing support 34. Hollow mill support 38 carries radial thrust bearings 40 and a rotatable hollow mill 42 which is adapted to be rotatably driven by an unshown power unit through a belt 41 which frictionally engages grooves 43 on hollow mill 42. A cutter head 44 is fixed to hollow mill 42. The cutter head has integral teeth 46 which cut away the contaminated surface of core rod 10. As an example, the original 0.610 inch aluminum rod diameter can be milled to a 0.578 inch rod diameter. This cutting action imparts frictional heat to the core rod to bring it up from room temperature to approximately 250°F. At this same point in the processing line, the electrical heating of the copper cladding strips 12 and 14 has raised their temperatures to approximately 700°F.

Figure 2:
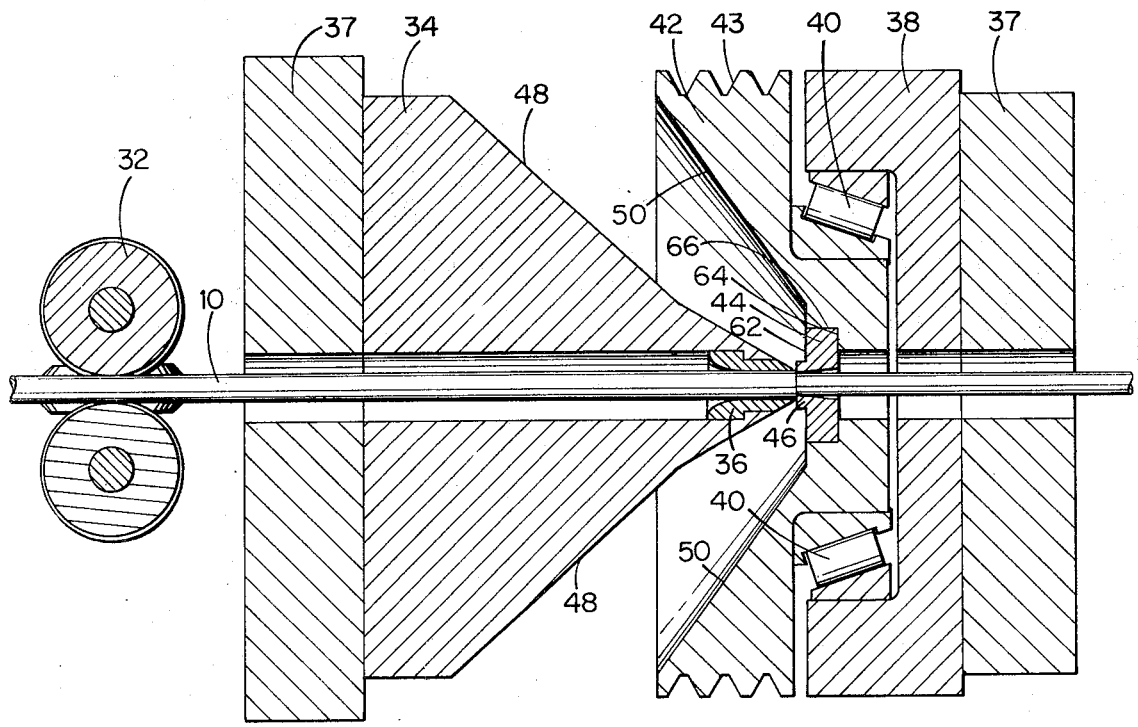
FIG. 2 is a view in section taken along line 2—2 of FIG. 1.

It will be understood from FIG. 2 that the aluminum chips produced by the cutting action of cutter head 44 are thrown out of the annular chip discharge chute formed by the downstream surface 48 of fixed bushing support 34 and the upstream surface 50 of rotating hollow mill 42. These aluminum chips are substantially uniform in length because of the previous scoring operation which reduces the chips' tendency to twist and tangle in the discharge chute or in the adjacent moving machinery. Preferably, an unshown chip deflection cover is mounted adjacent the upper portions of the discharge chute to direct the discharged chips downwardly to a chip collection bin.

The purpose of the milling operation is to produce an uncontaminated aluminum core rod surface to which the copper strips can be subsequently solid-phase bonded. The presence of contaminants at the bonding interface generally results in a faulty bond. The milling cutter of this invention produces an extremely clean surface on the core rod. However, not only is a clean surface produced, but most importantly, the clean core rod surface is simultaneously directed into and confined within the central aperture of the cutter head where it is maintained contamination-free until the bonding operation is completed.

The remaining steps in the copper clad aluminum processing line shown in FIG. 1 will now be briefly described. Reference should be made to our co-pending application Ser. No. 103,518, now U.S. Pat. No. 3,714,701 for a more detailed description, if desired.

While the core rod 10 is being milled by the rotary milling cutter, preformed strips 12 and 14 enter an enclosed retort 52 which contains a pressurized oxide-reducing atmosphere. Then, core rod 10 enters the retort 52 after passing through various cylindrical recesses which are maintained contaminant-free.

The copper strips and the aluminum core rod pass through the interior of retort 52 on converging paths until they are brought together in sequential guide boxes 54 and 56. In these guide boxes, the strips are positioned around the entire periphery of the core rod and the temperatures of the strips and the core rod are equalized by virtue of their mutual contact.

After leaving the second guide box 56, the clad rod composite exits from retort 52 and immediately enters the nip of bonding roll stand 58. The powered bonding rolls apply light to medium pressure in order to solid-phase bond the cladding strips to the core rod. The bonding action also produces a 6 percent to 20 percent reduction of the cross-sectional area of the clad rod between bonding roll entry and exit. The solid-phase bonded clad rod then moves to a take-up coil 60 where it is temporarily stored prior to wire drawing or other use.

As described in detail in both of our previously identified co-pending applications, various other metals and alloys can be substituted for the aluminum core rod 10 and the copper strips 12 and 14. Also, many other processes can be substituted for the copper clad aluminum line shown in FIG. 1 of the drawings herein. The rotary milling cutter of the present invention can be employed to remove the peripheral surface of any round metal rod in any process requiring such an operation. The key feature of this invention is the tooth design wherein by virtue of selected rod speed, rod diameter and cutter rotation speed, all contiguous edges of the teeth act as effective cutting edges which means that the rod surface is smoothly cut and the underlying fresh rod surface is immediately directed into and confined within the cutter head central aperture where contaminants are excluded.

Referring now to FIGS. 3 and 4, it will be seen that the rotary milling cutter of this invention includes a cutter head 44 which is mounted on hollow mill 42 and is rotatable therewith. Cutter head 44 has integral cutter teeth 46 which are preferably eight in number although they can be most any number ranging from approximately four to approximately 16.

Cutter head 44 has a generally cylindrical exterior shape with an upstream end wall 62, a downstream end wall 64 and a cylindrical wall 66 joining the two end walls. The cutter head 44 has an axial hollow central aperture which is formed therein by cutter head inner wall 68. The hollow central aperture is substantially cylindrical although it can optionally be frustoconical with its larger diameter end downstream.

Cutter teeth 46 have an exterior wall 70 extending at an approximate right angle from cutter head end wall 62, and a frusto-conical wall segment 72 which has its larger diameter end downstream where it is faired smoothly into the upstream end of cutter head inner wall 68. Referring to FIG. 4, the circular line 74 indicates where wall segment 72 joins wall 68.

The cutter teeth 46 each have inner surfaces forming an interior wall 76, a front surface 78, a top surface 80 and a rear surface 82. The interior wall 76 is preferably cylindrical and is faired smoothly into the upstream end of wall segment 72. Referring to FIG. 4 again, the circular line 84 indicates where wall 76 joins wall segment 72.

The cutting edges of the cutter teeth 46 are disposed at the central edges of interior cylindrical wall 76. The major cutting edge 86 is the central edge of front surface 78. The second cutting edge 88 is the central edge of top surface 80. The third cutting edge 90 is the central edge of rear surface 82. Although it is not critical, the cutter head operates more freely if the front, top and rear tooth surfaces are disposed so as to deflect the removed rod surface portions at angles less than 90° from the rod surface.

Figure 7:
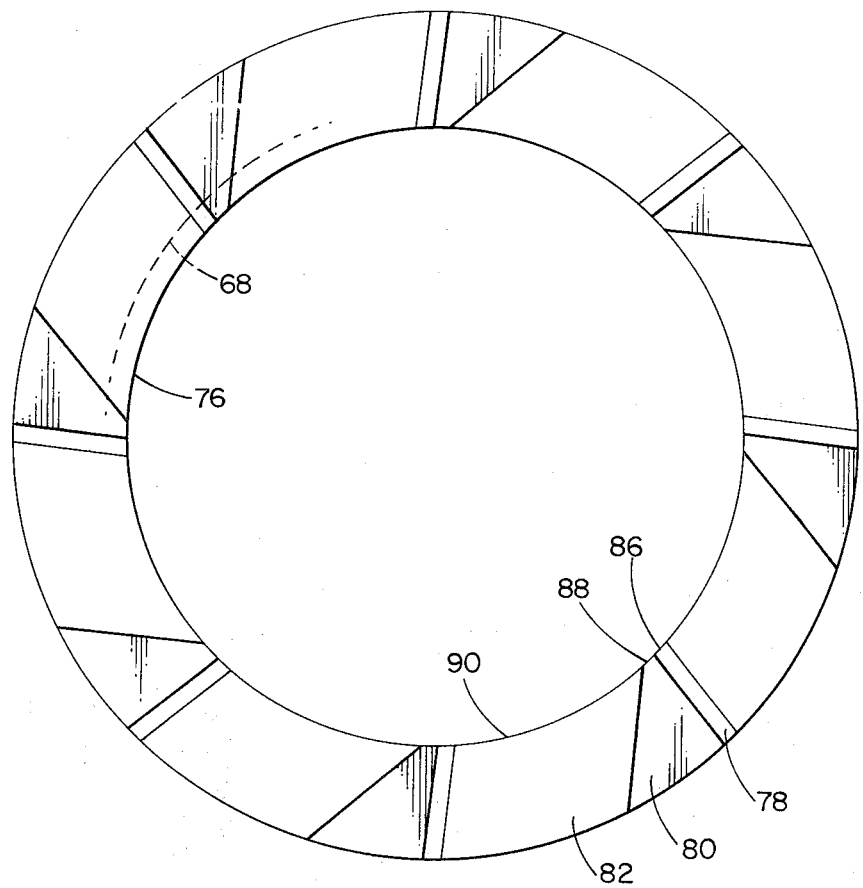
FIG. 7 is a top plan view of the cutter teeth shown on the milling cutter of FIG. 3.

Having now identified most of the surfaces and cutting edges of the rotary milling cutter of this invention, the following explanation is set forth to describe the cutting action of the teeth on core rod 10. It will be appreciated when viewing FIG. 7, that inner wall 76 defines the final circumference of the core rod after the milling operation has been completed. Also, it will be seen in FIG. 7, that the entire lengths of all three cutting edges 86, 88 and 90 are disposed on inner wall 76 and the cutting edges are contiguous. This means that cutting edges 86, 88 and 90 are in constant contact with the final circumference of core rod 10 and that no other element or surface of the milling cutter makes such contact except cylindrical interior wall 76.

Figure 8:
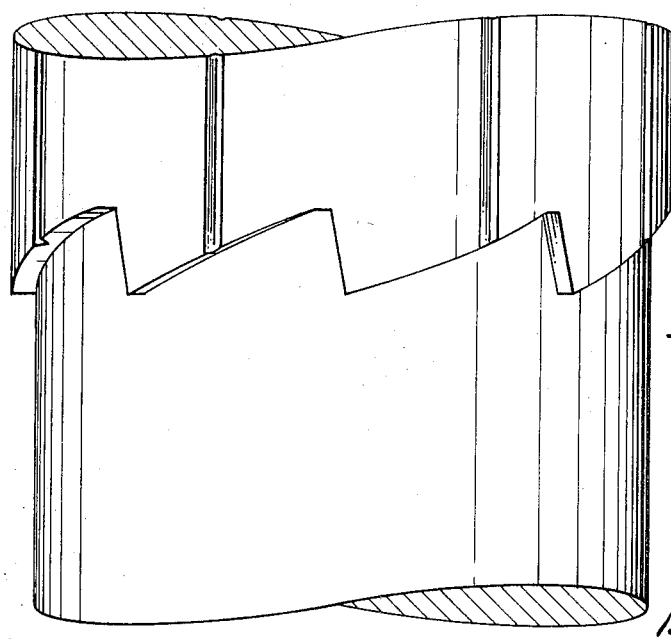
FIG. 8 is a perspective view of a segment of core rod which has been acted upon by the milling cutter of FIG. 3.

FIG. 6 shows the tooth profile of cutting teeth 46. In other words, if the ring of cutting teeth were cut and laid flat, the tooth profile would be as shown in FIG. 6. Likewise, if the milling cutter were stopped during the cutting operation and the core rod pulled out of the cutter's central aperture, the core rod's appearance would be as shown in FIG. 8. Comparing FIG. 6 and FIG. 8, it will be seen that the tooth profile is exactly duplicated on the cut rod which means that all cutting edges are simultaneously co-acting to remove the peripheral surface of the rod. If the FIG. 8 cutting pattern did not match the FIG. 6 tooth profile, it would mean that some portions of the central edges of interior cylindrical wall 76 were not actually cutting the peripheral surface of the rod. The reason that a central edge would not be a cutting edge would be that the rod surface does not advance toward it. Instead, the rod surface moves parallel to or away from the central edge as the rod moves into the rotating cutter head.

This statement makes desirable an explanation of the vector analysis diagram of FIG. 5. As the core rod moves into the central aperture of the rotating cutter head 44, there are two directional cutting path components which the teeth 46 follow on the core rod surface. The teeth rotate at a right angle to the rod axis and the teeth move parallel to the rod axis because of the axial rod movement. This relationship is diagrammed in FIG. 5 wherein the rotational component is labeled $x$ and the axial component is labeled $y$. Resolving the components produces a resultant cutting path R which forms an angle $\alpha$ with rotational component $x$. R is the actual direction which each point on the entire contiguous cutting edges 86, 88 and 90 travels on the core rod surface. It will be appreciated that angle $\alpha$ is determined by the speed of the core rod, the final size of the core rod and the angular speed of rotation of the cutter head 44.

For example, assume the speed of the core rod is 100 ft/min; the final circumference of the core rod is $\pi$ (0.578) inches; and the rotational cutter head speed is 1,800 RPM. Then, angle $\alpha = \tan^{-1} y/x = 1200/[1800 (\pi)(0.578)] = 20°$. Looking now at FIG. 6, it will be understood that all points on the tooth profile are moving at a 20° angle relative to a plane perpendicularly intersecting the core rod axis. Therefore, each central edge will be an actual cutting edge only if such edge forms an angle with said intersecting plane which is less than 20° or more than 200°. Stated more specifically, the trailing end of a central edge is the vertex of a counter-clockwise angle $\beta$ which the central edge forms with a base line lying in said perpendicular intersecting plane. To be a cutting edge, angle $\beta$ must be less than 20° or more than 200° (which is 20° + 180°). With respect to FIG. 6, all the edges are cutting edges. The angle $\beta$ for major cutting edge 86 is 288° about trailing end 87; the angle $\beta$ for second cutting edge 88 is 0° about trailing end 89; and the angle $\beta$ for third cutting edge 90 is 19° about trailing end 91. Of course, if the cutting head is rotating in the reverse direction from that shown in FIG. 3, angle $\beta$ is calculated in the clockwise direction.

FIG. 6 clearly shows the cutting paths produced by the cutting edges 86, 88 and 90. Major cutting edge 86 cuts path 186; second cutting edge 88 cuts path 188; and third cutting edge 90 cuts path 190. In the preferred embodiment referred to throughout this specification, path 186 is approximately .062 inches wide; path 188 is approximately 0.005 inches wide; and path 190 is approximately 0.005 inches wide. As can be seen, as each path is cut by its respective central edge, it passes immediately into and is confined within the central aperture of cutting head 44.

It will be understood that the milled rod which is confined within the cutter head central aperture is preferably subjected to a vacuum or to a selected non-oxidizing gas under pressure in order to maintain the contaminant-free condition of the rod surface. The vacuum or non-oxidizing gas would be drawn or introduced through a narrow passageway (not shown) drilled through hollow mill support 38 or in some other manner.

An optional added feature of this invention shall now be described. It may be desirable to counteract the torque effect of the rotary milling cutter head 44 on the core rod. This can be accomplished by providing another rotary milling cutter upstream of cutter head 44. For example, another entire unit such as is shown in FIG. 2 (with or without scoring rolls 32) can be installed in an immediately upstream location. Two changes should be made. Most important, the upstream mill must rotate in the opposite direction from mill 42 in order to neutralize the torque effects. Also, the upstream teeth are preferably designed to cut spiral lands and grooves in the core rod rather than a smooth cylinder. No effort is made by the upstream cutting operation to decontaminate the core rod. Furthermore, employment of such an upstream counter-rotating mill may obviate the need for scoring rolls 32.

The above description obviously suggests many possible variations and modifications of this invention which would not depart from its spirit and scope. It should be understood, therefore, that the invention is not limited in its application to the details of structure specifically described or illustrated and that within the scope of the appended claims, it may be practiced otherwise than as specifically described or illustrated.

We claim:

1. A rotary hollow milling cutter for removing the peripheral surface of a moving length of round metal rod, said milling cutter comprising:
   a. An annular cutter head having a hollow portion forming a central aperture into which the moving rod passes;
   b. a plurality of contiguous cutter teeth located on the upstream end of said cutter head, said teeth having inner surfaces forming a continuous cylindrical wall, said teeth inner surfaces having contiguous central edges forming the upstream end of said cylindrical wall; and
   c. means for rotating said annular cutter head at a rotational speed at which said teeth central edges all act as cutting edges.

2. The milling cutter of claim 1 further having a frusto-conical relief portion faired smoothly between the downstream end of said cutter teeth inner surface cylindrical wall and the upstream end of said hollow portion.

3. The milling cutter of claim 1 wherein the surfaces of said cutter teeth which extend away from said central edges are disposed so as to deflect the removed peripheral rod surface portions at angles less than 90° from the rod surface.

4. The milling cutter of claim 1 wherein each said cutter tooth has three differently angled edges forming said contiguous central edges.

5. The milling cutter of claim 1 wherein said cutter head and said cutter teeth are integral.

6. A process for removing the peripheral surface of a length of round metal rod comprising the following steps:
   a. moving the length of round metal rod into the central aperture of an annular cutting head; and
   b. rotating the annular cutter head at a speed at which the contiguous central teeth edges all act as cutting edges on the rod.

7. The process of claim 6 wherein the configuration of the central tooth edges, the rod diameter, the rod speed, and the cutter head rotational speed all coact to direct and to immediately confine the freshly milled rod surface to within the central aperture of the cutter head and to maintain said rod surface contaminant-free.

* * * * *